United States Patent [19]

Chopping et al.

[11] Patent Number: 4,617,659
[45] Date of Patent: Oct. 14, 1986

[54] FRAME ALIGNER FOR USE IN TELECOMMUNICATIONS SYSTEMS

[75] Inventors: Geoffrey Chopping, Wimborne; Ian J. Lawrie, Poole; Milan Z. Maric, Wimborne, all of England

[73] Assignee: The Plessey Company plc, Ilford, England

[21] Appl. No.: 669,358

[22] Filed: Nov. 8, 1984

[30] Foreign Application Priority Data

Dec. 13, 1983 [GB] United Kingdom ............... 8333214

[51] Int. Cl.⁴ .................. H04J 3/06; H04L 7/00; H04L 25/36; H04L 25/40
[52] U.S. Cl. .................................. 370/100; 375/118
[58] Field of Search ............... 370/100, 108; 375/106, 375/107, 118

[56] References Cited

U.S. PATENT DOCUMENTS

| | | | |
|---|---|---|---|
| 4,121,057 | 10/1978 | Luder | 370/100 |
| 4,368,531 | 1/1983 | Chopping | 370/100 |
| 4,429,386 | 1/1984 | Graden | 375/118 |
| 4,525,849 | 6/1985 | Wolf | 375/118 |

Primary Examiner—Douglas W. Olms
Assistant Examiner—Frank M. Scutch, III
Attorney, Agent, or Firm—Fleit, Jacobson, Cohn & Price

[57] ABSTRACT

An aligner (FIG. 1), which has seven registers SRGA to SRGG each of 64 bits in length, is used to align incoming line signals to exchange data rate and to convert exchange rate data signals into line rate data signals. The aligner behaves as a variable delay and is required to operate in any one of three modes; (i) frame aligning 2,048 k Bits/second line signals to a 2,048 k Bits/second exchange rate, (ii) aligning 1,544 k Bits/second line signal to a 2,048 k Bits/second exchange rate and (iii) converting a 2,048 k Bits/second exchange rate to a 1,544 k Bits/second line rate. In the third mode of operation it is necessary to derive the line clock from the exchange local clock. This is achieved by forming a phase-locked loop (FIG. 5) incorporating the delay of a standard aligner and driving the loop with the exchange frame reset signal (f IN).

4 Claims, 18 Drawing Figures

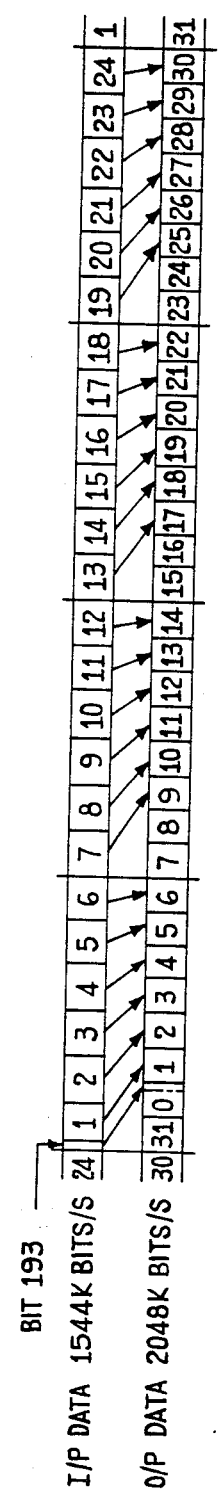
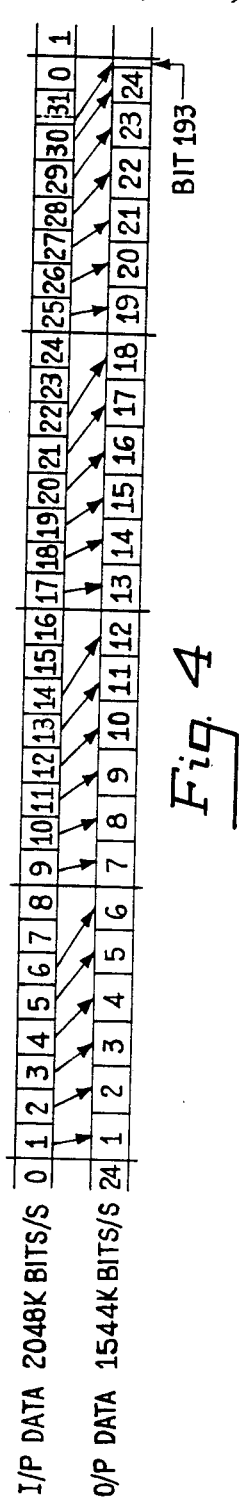
Fig. 2
Fig. 3
Fig. 4

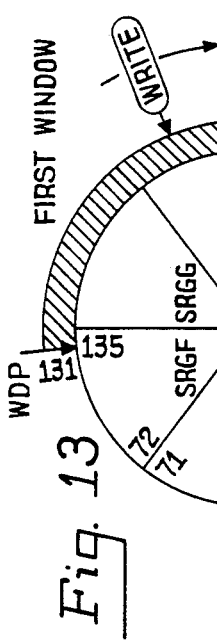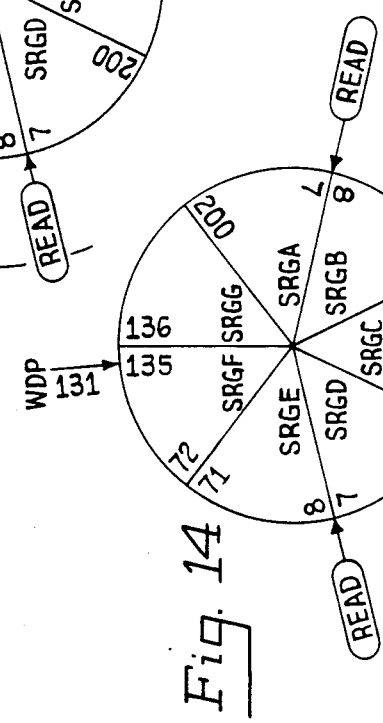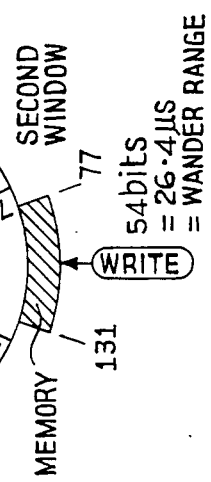

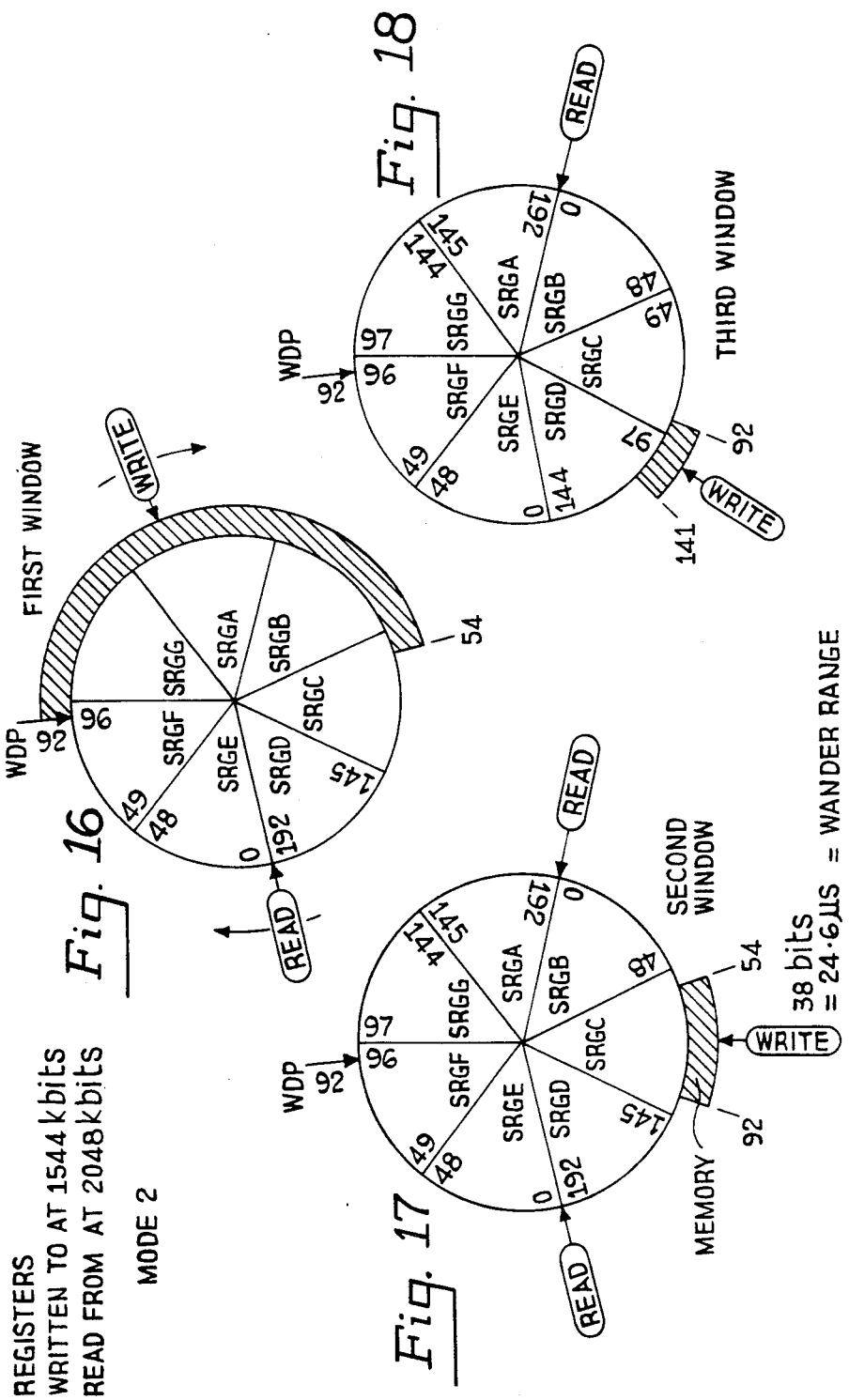

FRAME ALIGNER FOR USE IN TELECOMMUNICATIONS SYSTEMS

BACKGROUND OF THE INVENTION

1. Field of the Invention

The present invention relates to frame aligners for use in telecommunication exchanges handling digital information in, for example, time division multiplex form.

2. Description of the Related Art

In large national telecommunication networks e.g. employing telephone exchanges, the transmission of digital information or data over highways or junctions between the exchanges can not be handled on a completely synchronised basis by relying on the overall network synchronisation arrangements.

Inevitably, during the transmission of data over a high-way or junction between exchanges in the network, the phase relationship between the multiplex of the transmitted data on the highway or junction, and the multiplex at the receiving exchange varies in accordance with a permissable drift (say eight bits of data) which is related to the frequency of the clock systems of the respective exchanges.

The frame aligner is designed to compensate for this drift, and prevents loss of transmitted data by ensuring that the multiplex at the receiving exchange is controlled to be in synchronism with the multiplex on the highway or junction.

A 32-channel pulse code modulated (p.c.m.) frame aligner comprising a "single chip" for use in digital switching systems is disclosed in British Specification No. 2063624. In this aligner in order to align an incoming 256-bit p.c.m. data stream to the local exchange timing, the aligner incorporates five shift registers each of 128 bits in length (one half-frame of data) and a slip mechanism which monitors the incoming clock and exchange clock rates to ensure that the READ and WRITE counters, which control the data being written-to and read-from the shift registers do not concurrently select the same shift register section.

This aligner will only operate satisfactorily between systems which are compatible i.e. 32 channel system incoming and 32 channel outgoing. Such an aligner will not therefore align data between incompatible systems.

SUMMARY OF THE INVENTION

According to the present invention there is provided a frame aligner for use in a time division multiplex communication system of the synchronous network type in which a digital data bit stream is transmitted over a data highway interconnecting a first communication exchange and a second communication exchange each exchange incorporating its own individually operating clock arrangement for defining a time division frame, the frame aligner comprising seven quarter frame shift register sections each section being independently accessible for read and write operations, a read select counter arranged to select the shift register section from which the next quarter frame of data is to be read, a write select counter arranged to select the shift register section into which the next quarter frame of data received on the data highway is to be fed, a slip mechanism which monitors the clock incoming from the first exchange and the clock of the second exchange, and controls the read select counter in order that the read select and write select counters do not concurrently select the same shift register section, and a control means for selecting one of a plurality of modes in which the aligner is to operate, the mode selected enabling frame alignment either (i) between two separate and equal number channel digital p.c.m. systems or (ii) between two separate and differing number channel digital p.c.m. systems.

The invention will be better understood from the following description of an exemplary embodiment which should be read in conjunction with the accompanying drawings in which:

BRIEF DESCRIPTION OF THE DRAWINGS

FIG. 2 shows the relationship between the input data and the output data for the first mode of operation (MODE 1) of the aligner;

FIG. 3 shows the relationship between the input data and the output data for the second mode of operation (MODE 2) of the aligner;

FIG. 4 shows the relationship between the input data and the output data for the third mode of operation (MODE 3) of the aligner;

DESCRIPTION OF THE PREFERRED EMBODIMENT

Figure 1:
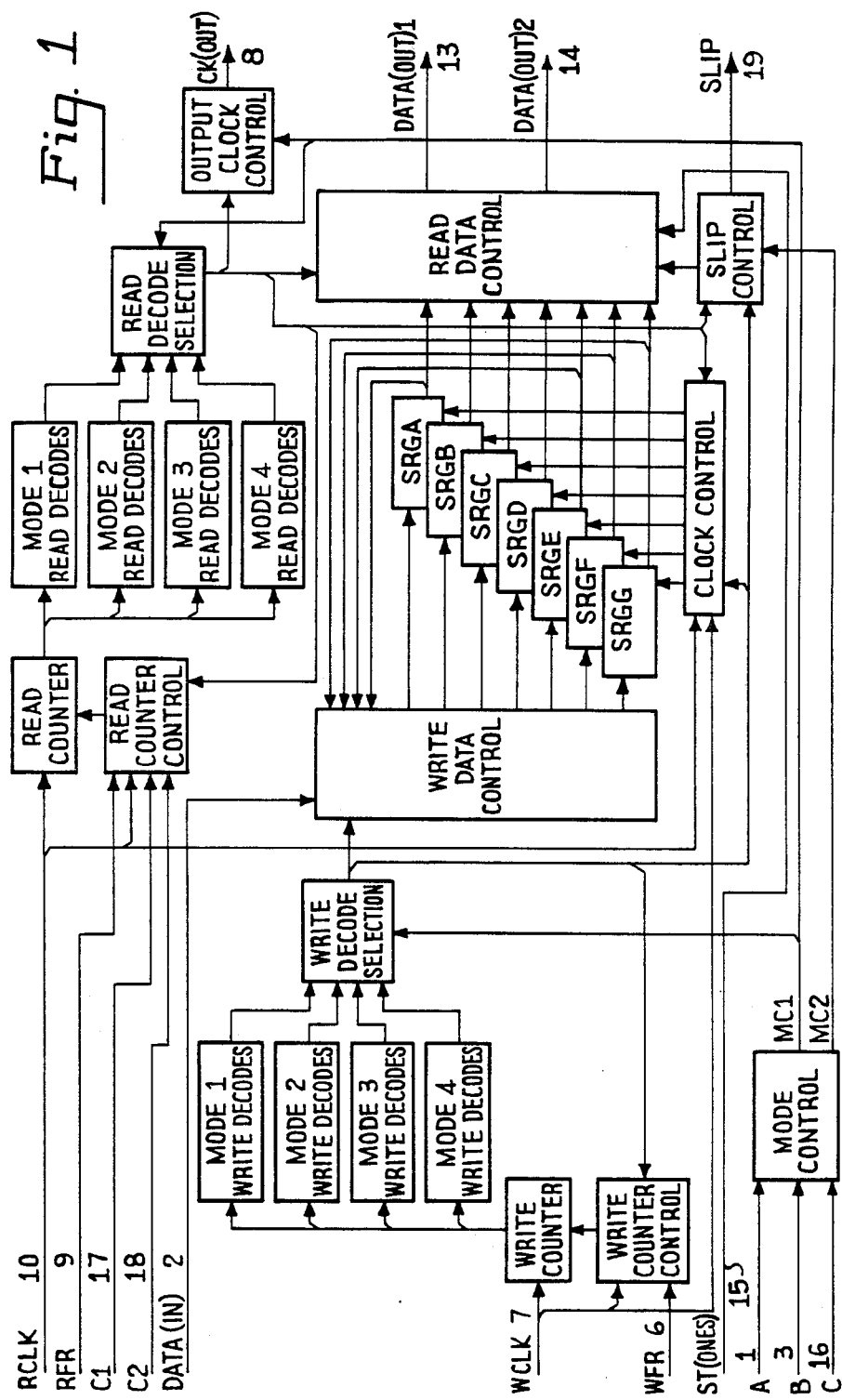
FIG. 1 shows a block schematic of the frame aligner read/write control logic for the shift register sections (seven registers) according to this invention.

Referring now to the drawings, the aligner of this invention reduces the delay in the digital switching system (compared with the earlier aligner), and is capable of being used when interfacing between 24 and 32 channel digital P.C.M. systems. Alignment is implemented on a frame basis, a frame of data being 125 micro-seconds long. A 2048 Kbits/s frame comprises 32 channels, numbered 0-31, each containing 8 bits numbered 1-8. A 1544 kbits/s frame comprises 24 channels, numbered 1-24, each containing 8 bits numbered 1-8 plus an additional bit, bit 193.

The main requirements of the aligner is; to operate in any one of four different modes. MODE 1; to frame align a received 2048 kbit/s p.c.m. line signal to a 2048 kbits/s exchange data rate and 8 KHz frame synchronisation. MODE 2: To frame align and frequency change a received 1544 kbits/s line data rate to a 2048 kbits/s exchange data rate and 8 KHz frame synchronisation. MODE 3: To convert from an exchange data rate of 2048 kbits/s to a line data rate of 1544 kbits/s. MODE 4: This mode concerns an operation where the slip mechanism is controlled separately.

Additionally, the aligner is capable of reporting frame slips but does not differentiate between omission or repetition and is capable of providing a data output with the third bit in all channel 0's, when working in MODE 1, together with being capable of forcing the data output DATA(OUT)1, and DATA(OUT)2 to logic 1's.

This aligner, which has seven registers (FIG. 1) each 64 bits in length instead of five registers of 128 bits in length as disclosed in British Specification No. 12063624, behaves as a variable delay to enable secure data transfer from the line to the exchange. Due to relative slip between the line and exchange clocks the maximum delay of this device may be reached. Whenever this occurs one complete frame of data is omitted and the delay is reduced by one frame. Whenever the minimum delay is reached, one complete frame of data is repeated and the delay is increased by one frame.

If, after the repetition of a frame, the rate of slip is reversed, a frame omission will not occur until a relative slip of at least 20 micro-seconds has taken place. Similarly, if, after the omission of a frame, the rate of slip is reversed a frame repetition will not occur until a relative slip of at least 20 micro-seconds has taken place.

The three basic modes of operation are illustrated in FIGS. 2, 3 and 4, where the relationship between the input and output data are shown. To aid understanding, 32 consecutive channels of data are subdivided into groups of 8. For the first mode MODE 1 of operation the receive line and receive exchange clock rates are both nominally 2048 KHz. For every 64 bits read in the aligner, 64 bits are read out.

In MODE 2 the receive line clock rate is 1544 KHz and the receive exchange clock rate is 2048 KHz. For one quarter frame 49 bits are read in and 64 bits are read out. This is followed by the other three quarter-frames during which 48 bits are read in and 64 bits are read out. The exchange data in the remaining 15 or 16 bits of each quarter frame being undefined, i.e. channels 7, 8, 15, 16, 23, 24, 31 AND 0 (bits 1–7) (channel 0 bit 8-bit 193).

The third mode MODE 3 of operation is the opposite of the second mode MODE 2, that is, each quarter frame read contains 64 bits, 15 or 16 of which are not transferred to the data output. During one quarter-frame 49 bits are read out and during the next 3 consecutive quarter frames 48 bits are read out. In this mode of operation it is assumed that the transmit 2048 KHz exchange clock and the 1544 KHz line clock will be related, and that no slips will occur. The device in this mode is configured so that the maximum delay will not exceed 40 micro-seconds. It should be noted that channels 7, 8, 15, 16, 23, 24, 31 (bits 2–8) and 0 will not be transferred channel 31 bit 1 is transferred as bit 193.

Generation of 1544 KHz and associated frame reset

Figure 5:
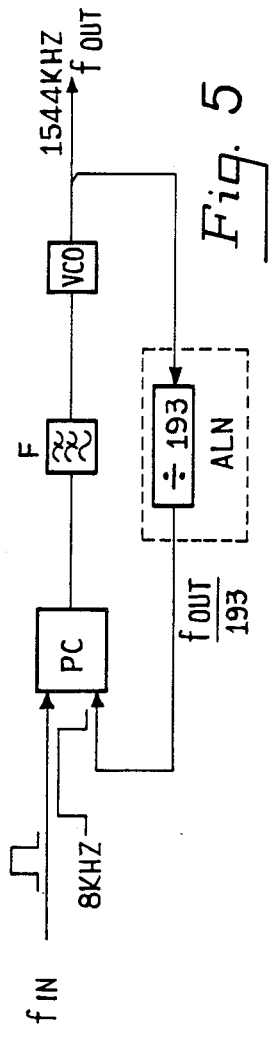
FIG. 5 shows a block diagram of the circuit for generating 1544 KHz and the associated frame reset signal employed in MODE 3.

Referring to FIG. 5, it should be understood that MODE 3 i.e. converting 2048 kbit/s 32 channel time slots to 1544 kbit/s 24 channel time slots, the requirement exists to derive a 1544 KHz clock (local) from the exchange (local) 2048 KHz clock. This is achieved by the provision of an external Voltage Controlled Oscillator VCO which is used with an external counter ÷193 to frequency synthesise a 1544 KHz clock from the 2048 KHz exchange clock. A common sub-multiple of both 1544 KHz and 2048 KHz is 8 KHz. The exchange frame reset clock has a p.r.f. of 8 KHz and is synchronous with 2048 KHz clock. Hence, by using the 8 KHz exchange frame reset f IN as the reference input to a Phase Locked Loop (PLL), it is possible to generate a phase locked 1544 KHz output. In FIG. 5 it is seen that the 8 KHz exchange frame reset f IN and f out/193 are fed to a phase comparator PC, the output of which is fed to a filter F, its output being fed to the voltage controlled oscillator VCO.

The PLL requires a ÷193 counter in its feedback path and conveniently the aligner ÷193 counter is employed.

Having derived the 1544 KHz clock, a second requirement is the generation of the read frame reset associated with the 1544 KHz clock. As the output of the ÷193 counter has a pulse repetition frequency (p.r.f.) of 8 KHz and is synchronous with the 1544 KHz clock, it satisfies two of the requirements for the read frame reset. The third requirement is that of its position in time with respect to the data being read from the aligner.

In order to determine the correct position in time of the read frame reset associated with the 1544 KHz clock, it is necessary to consider the aligner specification which requires that in this mode of operation, the delay between write and read functions should be a minimum. The minimum safe practical delay is of the order of $\frac{3}{8}$ (three-eighths) of a frame; a few bits either side of this minimum is acceptable.

A delay of $\frac{3}{8}$ (three-eighths) frame is equivalent to about 47 μs (72 bits), hence, the read frame reset must occur at about 47 μs after the write (exchange) frame reset.

The leading edge of the output pulse from the ÷193 is forced by the Phase Locked Loop (PLL) to be concurrent with the leading edge of the reference write frame reset. It is only necessary then to make the output pulse from the ÷193 approximately 47 μs in duration, and use the trailing edge to indicate the time of read frame reset. The design of the aligner internal circuitry is such as to ensure that the trailing edge of this pulse occurs at the correct time with respect to the output data stream.

The operation of the aligner (FIG. 1) is similar to the operation of the aligner disclosed in British Specification No. 2063624 except that instead of five register sections being employed, seven register sections SRGA to SRGG, are employed, giving $\frac{1}{4}$ (one-quarter) frame delay instead of $\frac{1}{2}$ (one-half) frame delay as was the case previously. Additionally, as this aligner is required to operate between data streams of differing speeds i.e. 1544 kbits/sec and 2048 kbits/sec and vice-versa, the mode of operation of the circuit requires to be controlled by selection. The selection is undertaken by the mode control MC by the application of three-bit mode selection codes to the paths A, B and C. Paths A and B provide the necessary control over path MC1 to the WRITE DECODE SELECTION logic, and the OUTPUT CLOCK CONTROL logic, while path C provides the necessary control over path MC2 to the SLIP CONTROL.

The control of these paths by the mode selection codes together with their operating modes are set out in the table below.

TABLE 1

| MODE | (PIN 1) PATH A | (PIN 3) PATH B | (PIN 16) PATH C | WRITE DATA | READ DATA |
|---|---|---|---|---|---|
| 1 | LOGIC 0 | LOGIC 0 | LOGIC 0 | 2048 | 2048 |
| 2 | LOGIC 1 | LOGIC 0 | LOGIC 0 | 1544 | 2048 |
| 3 | LOGIC 1 | LOGIC 1 | LOGIC 1 | 2048 | 1544 |
| 4 | LOGIC 0 | LOGIC 0 | LOGIC 1 | 2048 | 2048 |

Path C Operation (PIN 16)

When this pin is set to a logic '0' condition the slip mechanism operates under normal control requirements. However, when the pin is set to a logic '1' condition, the slip mechanism is forced into a state of "LAST SLIP WAS TO SRGB". This facility is used when the READ COUNTER and the WRITE COUNTER are in bit synchronisation and no wander is expected (although there may be some jitter).

Figure 11:
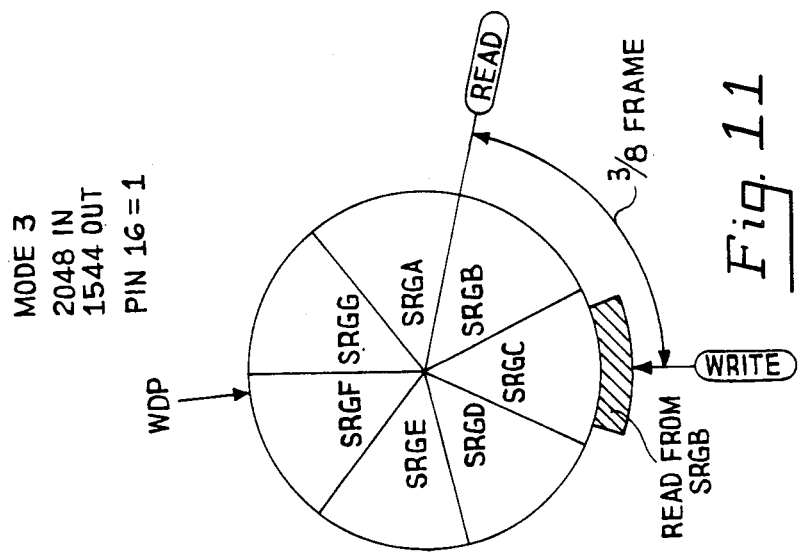

When the 1544 kbits/sec clock is being generated from the 2048 kbits/sec clock, or vice versa, the clocks will not wander with respect to each other, and the write frame reset and read frame reset signals will be spaced as ⅜ (three-eigths) of a frame apart by the action of the output clock CK(OUT) on pin 8; FIG. 11 illustrates this operation. It should be noted that the reference WDP used in FIG. 11 to FIG. 18 represents "write data pointers".

Figure 12:
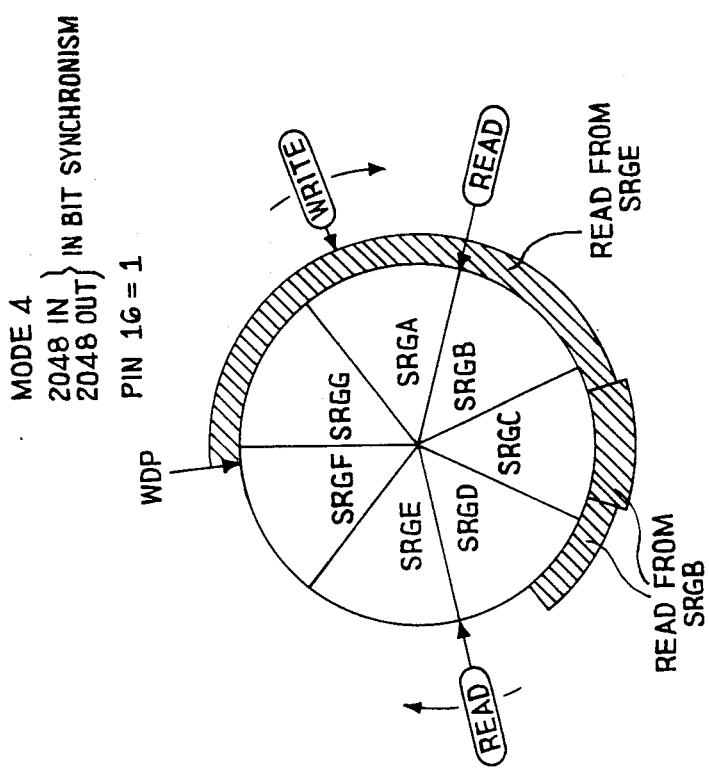

When the aligner is being used in MODE 1 (2048 to 2048) and path C (pin 16) set at a logic '1' condition, the effect of this control of the aligner is to ensure the minimum delay consistant with alignment. FIG. 12 illustrates this operation and forms the basis of MODE 4 operation.

Figure 6:
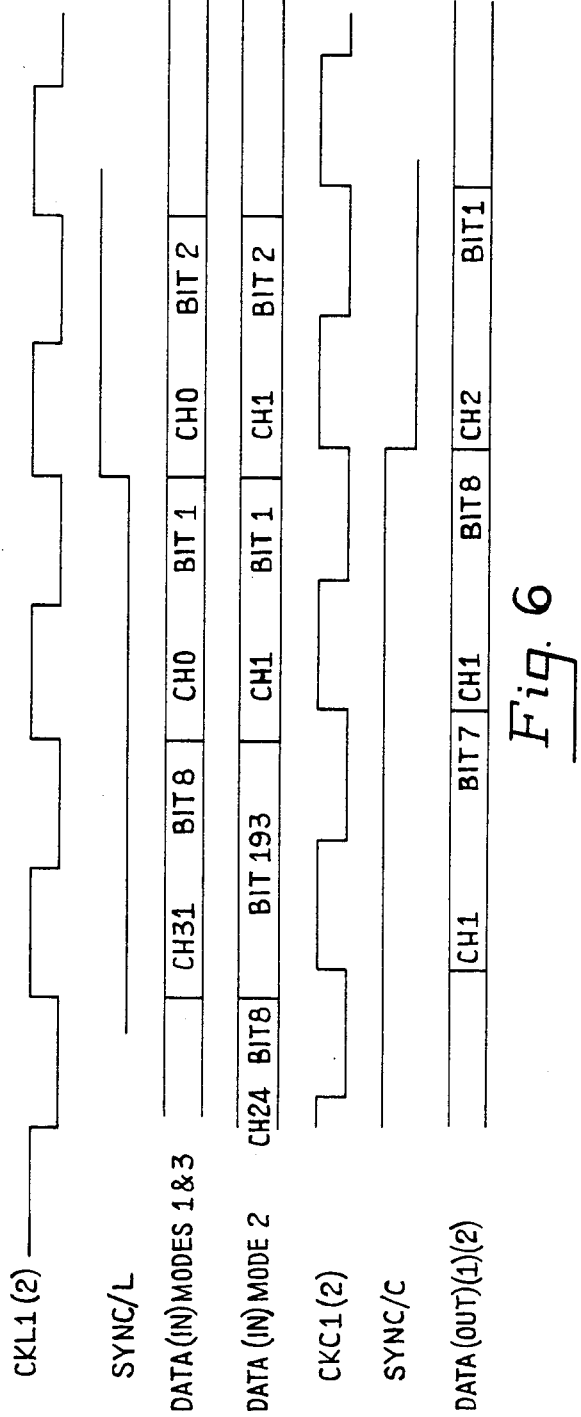
FIG. 6 shows a set of waveforms in relation to the operation of the aligner in accordance with this invention.
Figure 7:
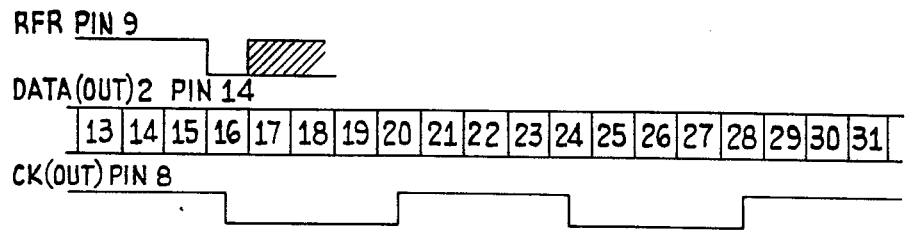
FIG. 7, FIG. 8 and FIG. 9 illustrate the relationship in the three modes respectively of the data out of the aligner with the output clock signals.
Figure 8:
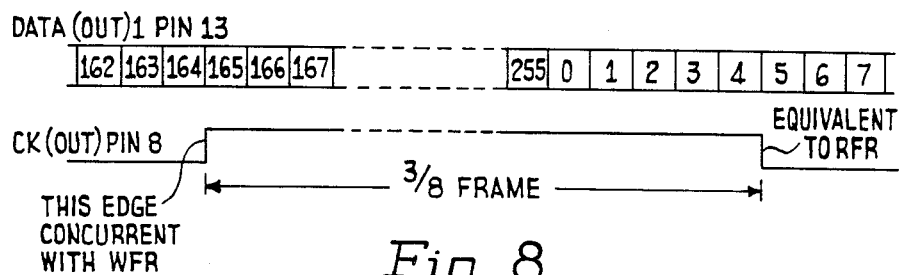

The general operation of the aligner is similar to that disclosed in British Specification No. 2063624, however, its particular operation will be further appreciated with reference to FIG. 6 which shows the relationship between various signal waveforms as set out below.
1. DATA(IN) NRZ data input.
2. CLK1(2) Two input clock supplies.
3. SYNC/L Input synchronisation signal 'write frame reset' (WFR).
4. SYNC/C Output synchronisation signal 'read frame reset' (RFR).
5. DATA(OUT)1 This will be a true data output, allowing for frame slips.
6. DATA(OUT)2 As 5, except that Bit 3 of all channel 0's are inverted.

In this figure, it should be noted that DATA(IN) is caught by the falling edges of CLK1(2); DATA(OUT)2 is launched by the rising edges of CKC1(2). The DATA(OUT)1 is delayed from DATA(OUT)2 by a predetermined number of bits while both SYNC/L and SYNC/C are caught by their respective clocks with the leading edge differentiated to provide synchronous presets/resets to their respective counters.

Operations of Output Pin 8

This pin performs 3 functions depending on which mode of operation the aligner is operating in.

(a) When the aligner is in MODE 1 (FIG. 7, FIG. 13, FIG. 14, and FIG. 15)

i.e. 2048 kbit/s write
  pin 1 = Logic '0'
2048 kbit/s read the output from pin 8 is the read clock ÷8 i.e. 256 KHz (b) When the aligner is in MODE 2 (FIG. 8, FIG. 16, FIG. 17 and FIG. 18)

i.e. 1544 kbit/s write pin 1 = Logic '1'

2048 kbit/s read pin 3 = Logic '0' the output from pin 8 is the read clock ÷256 this is used for the generation of a 2048 KHz clock from the 1544 KHz clock when used in conjunction with the phase locked loop (PLL). When this clock generation function is being performed pin 16 is at a logic '1'.

Pins 17 and 18 are both held to a logic '0'

Figure 9:
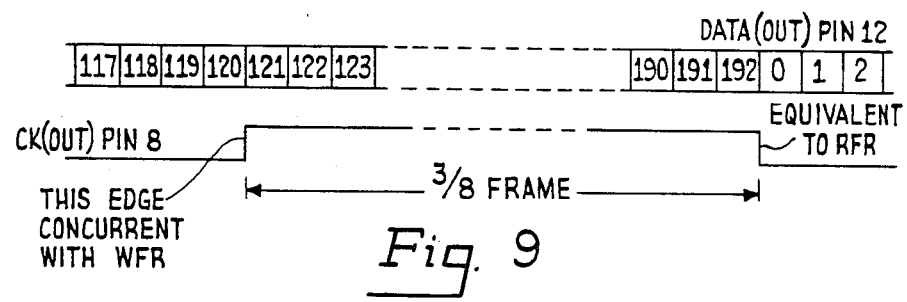

(c) When the aligner is in MODE 3 (FIG. 9 and FIG. 11)

i.e. 2048 kbit/s write pin 1 = logic '1'

1544 kbit/s read pin 3 = logic '1'

The output from pin 8 is the read clock ÷193 This is used for the generation of a 1544 KHz clock from the 2048 KHz clock when used in conjunction with the phase locked loop (PLL). When this clock generation function is being performed pin 16 is to be held at a logic '1'.

Pins 17 and 18 are both held at a logic '0'.

Operations of pins 17 and 18 (Frame reset delay control)

Figure 10:
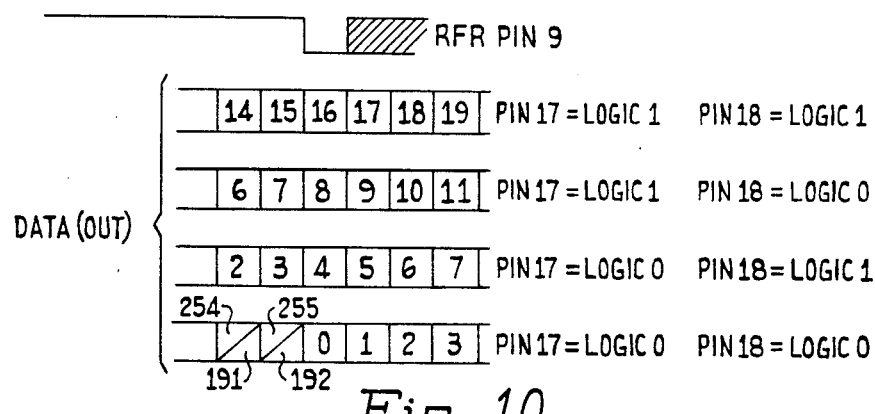
FIG. 10 shows the relationship between the data output and the read frame reset signals; and, FIG. 11 to FIG. 18 show various diagrams relating to the modes of operation of the aligner slip mechanism in accordance with this invention.

In this aligner the occurrence of the read frame reset signal is concurrent with bit 16 in the output data stream. However, by use of pins 17 and 18, the relationship between the read frame reset signal and the output data stream can be programmed as shown in FIG. 10.

Operation of pin 15 ST(ONES)

This controls the forcing of both data outputs DATA(OUT)1 and DATA(OUT)2 to all logic 1's.

Operation of pin 19 SLIP

This is an output signal indicating a slip occurrence.

We claim:
1. A frame aligner for use in a time division multiplex communication system of the synchronous network type in which a digital data bit stream is transmitted over a data highway interconnecting a first communication exchange and a second communication exchange, each exchange incorporating its own individually operating clock arrangement for defining a time division frame, the frame aligner comprising: seven quarter frame shift register sections, each section being independently accessible for read and write operations; a read select counter arranged to select the shift register section from which the next quarter frame of data is to be read; a write select counter arranged to select the shift register section into which the next quarter frame of data received on the data highway is to be fed; a slip mechanism which monitors the clock incoming from the first exchange and the clock of the second exchange, and controls the read select counter in order that the read select and write select counters do not concurrently select the same shift register section; a control means for selecting one of a plurality of modes of operation in which the aligner is to operate, the mode of operation selected enabling frame alignment either (1)between two separate and equal number channel digital p.c.m. systems or (2) between two separate and differing number channel digital p.c.m. systems; a phase locked loop for generaing a 1544 Kilo Hertz clock which is derived from an exchange 2048 Kilo Hertz clock: and three controls paths which are associated with said control means for application of one of a plurality of mode of operation control-codes to select the mode of operation in which the aligner is to operate;

wherein any one of four modes of operation is selected by the application of any one of four separate and different three-bit mode of operation selection codes to the three mode of operation controlpaths;

wherein in the first mode of operation, the aligner frame aligns between a received p.c.m. line signal at a data rate of 2048 Kilo bits per second and a p.c.m. exchange data rate of 2048 Kilo bits per second where the frame synchronisation rate is 8 Kilo Hertz;

wherein the second mode of operation, the aligner frame aligns and frequency changes between a received p.c.m. line signal at a data rate of 1544 Kilo bits/second and a p.c.m. exchange data rate of 2048 bits/second where the frame synchronisation rate is 8 Hertz;

wherein the third mode of operation, the aligner effects conversion from an exchange data rate of 2048 Kilo bits per second to a line data rate of 1544 Kilo bits per second using the phase locked loop; and wherein in the fourth mode of operation, the aligner operates as in the first mode of operation, and is controlled to ensure alignment with minimum delay where no significant jitter or wander is expected.

2. A frame aligner as claimed in claim 1, in which the phase locked loop includes a phase comparator, filter means and a voltage controlled oscillator, wherein the output of the phase comparator is connected with the input of the filter means and the output of the filter means is connected with the input of the voltage controlled oscillator and wherein upon an 8 Kilo Hertz exchange frame reset clock reference input, being a submultiple of the 2048 Kilo Hertz exchange clock, being applied to the input of the phase comparator, the 1544 Kilo Hertz clock is derived on the output of the voltage controlled oscillator.

3. A frame aligner as claimed in claim 2, in which counter means divides the 1544 Kilo Hertz clock by 193 and applies an output pulse to the phase comparator which forces the leading edge of the output pulse to be concurrent with the reference input.

4. A frame aligner as claimed in claim 3, in which the duration of the output pulse is arranged to be equivalent to three eighths ($\frac{3}{8}$th) of one frame in order that the trailing edge of the pulse is in a position relative to the leading edge of the output pulse to serve as the read frame reset signal.

* * * * *